Nov. 21, 1944.  A. C. GIBSON  2,363,126
DRIVE FOR LANDING GEAR WHEELS OF AIRPLANES
Filed Nov. 21, 1942  2 Sheets-Sheet 1
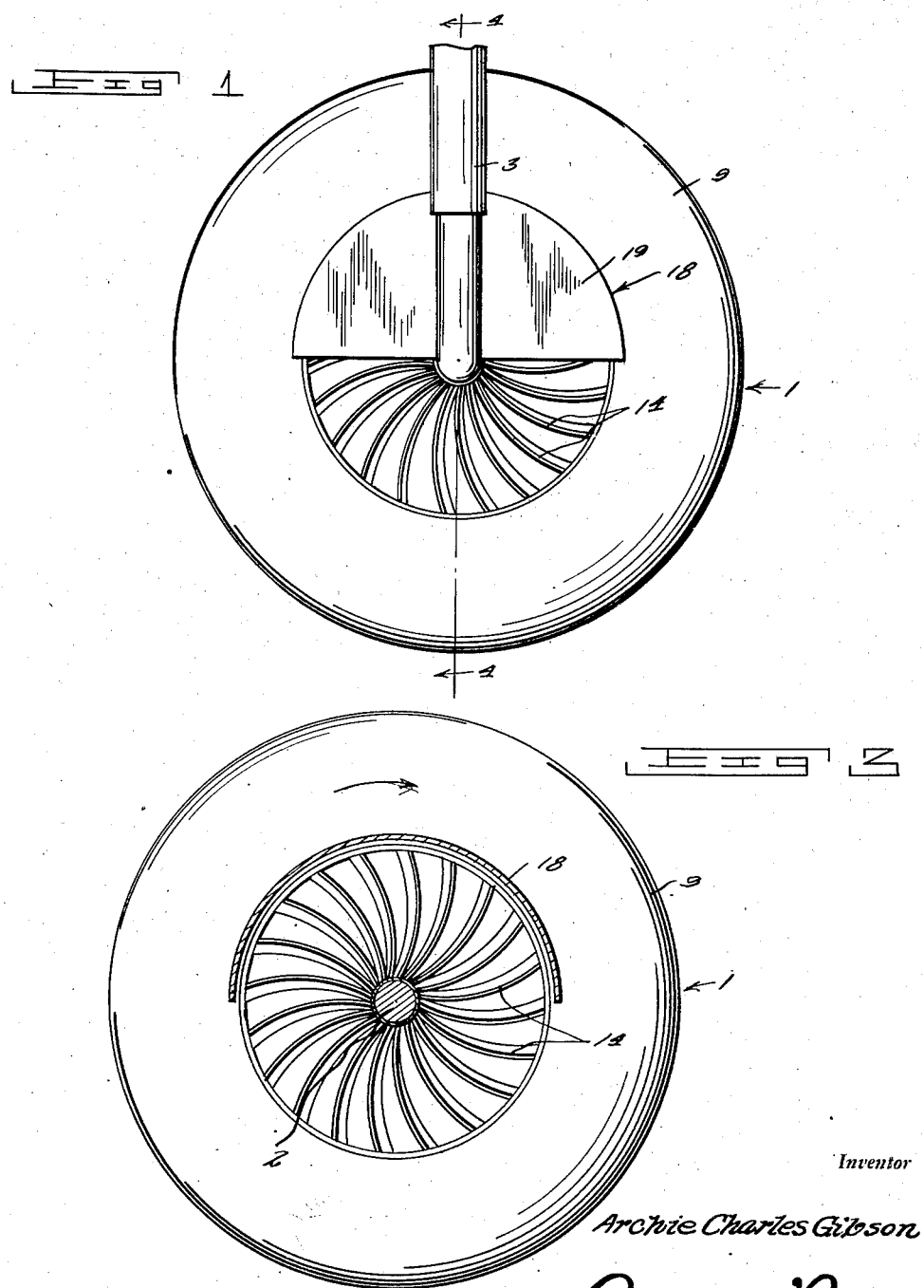

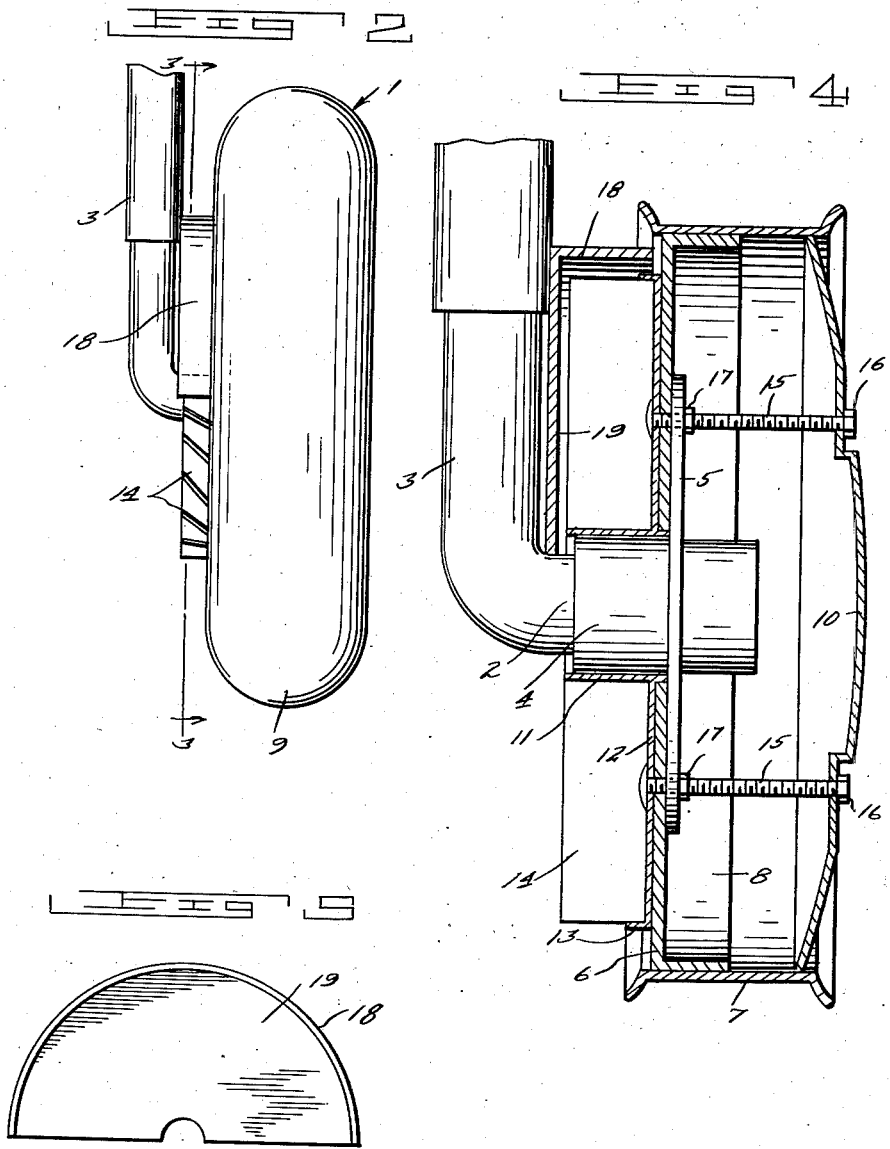

Patented Nov. 21, 1944

2,363,126

UNITED STATES PATENT OFFICE 2,363,126

DRIVE FOR LANDING GEAR WHEELS OF AIRPLANES

Archie Charles Gibson, Baltimore, Md.

Application November 21, 1942, Serial No. 466,465

2 Claims. (Cl. 244—103)

My invention relates to improvements in wheel drives for landing gear wheels of airplanes, the principal object in view being to equip such wheels with inexpensive, efficient and easily installed means for causing, under impact of air against the same, rotation of the wheels in the air preparatory to landing, so that wear on the wheel tires incident to landing will be minimized, also tendency of airplanes to nose over when landing.

Other and subordinate objects are also comprehended by my invention, all of which, together with the precise nature of my improvements and the advantages thereof, will be readily understood when the succeeding description and claims are read with reference to the drawings accompanying and forming part of this specification.

In said drawings:

Figure 1 is a view in side elevation of a landing gear wheel equipped according to my invention and showing the inboard side of the wheel, Figure 2 is a view in front elevation, Figure 3 is a view in vertical section taken on the line 3—3 of Figure 1 and with parts shown in elevation, Figure 4 is a view in vertical section taken on the line 4—4 of Figure 1, and Figure 5 is a view in side elevation of the hood detached.

Referring to the drawings by numerals, my improvements have been shown therein, by way of exemplification, as forming part of the equipment of a landing gear wheel 1 rotatably mounted on the axle 2 of a landing gear column 3 of the usual type. The wheel 1, as shown, comprises a hub 4 extending rearwardly of the inboard side of the wheel 1 and provided with a central, circumferential flange 5 opposed to the outboard side of an annular wheel web 6 which is located adjacent the rear edge of the rim 7, fitted around the hub 4, and provided with an outwardly extending, annular, edge flange 8 suitably secured in and supporting the rim 7 which is of the usual type for mounting a pneumatic tire 9. The wheel web 6 is spaced outwardly from the column 3, and the outboard side of the rim 7 is closed by a closure plate 10.

On the inboard side of the wheel 1 is an impeller unit comprising an axial, tubular sleeve 11 fitting over the rear portion of the hub 4 and into the web 6 against the flange 5, a circular circumferential, plate-forming flange 12 slightly smaller in diameter than the web 6 and opposed flat against the inboard side of said web, a lateral annular, outer edge lip 13 on said flange 12, rearwardly extending, and a series of impeller blades 14 radiating from the sleeve 11 and extending to the lip 13 in the space between the web 6 and the column 3. Screw bolts 15 extended through the flange 4, web 6, flange 5 and closure plate 10 with nuts 16 on the outer ends thereof and jam nuts 17 turned against the outer face of the flange 5 secure the impeller unit to the wheel 1, the flange 5 against the web 6, and the cover plate 10 in place. The impeller blades 14, as best shown in Figures 1 and 3, are curved longitudinally and twisted transversely to present concave faces below the horizontal center of the unit to the wind, and to incline laterally and obliquely from the flange 12 to feather the blades rearwardly as regards the direction of travel of the airplane.

A semi-circular hood 18 having an inboard side wall and an open front is suitably secured to the column 3 to cover, and together with the flange 12 enclose the upper half of the series of blades 14 when the landing gear is let down.

As will now be seen, when the landing gear is let down and the airplane is in flight, the wind will impact the blades 14 extending below the hood 18 and cause the wheel 1 to revolve in the proper direction for landing. When the landing gear is retracted, rearwardly as usual, the hood 18 will form a guard in front of the series of blades 14 preventing the wind from striking any of the blades and the wheel will therefore remain stationary. The pitch, curvature and size of the blades 14 may be varied in accordance with requirements of wheels of different sizes, and other factors, to attain rotation of the wheel at the proper speed.

The foregoing will, it is believed, suffice to impart a clear understanding of my invention without further explanation.

Manifestly, the invention, as described, is susceptible of modification without departing from the inventive concept, and right is herein reserved to such modifications as fall within the scope of the appended claims.

What I claim is:

1. In a landing gear for airplanes, including a column adapted to depend from said airplane and having a lateral axle, a wheel having a hub rotatable on said axle, an impeller unit at one side of said wheel comprising a tubular sleeve fitted over said hub, a radial plate forming circular flange surrounding said hub, and a series of impeller blades radiating from said hub and having side edges attached to said flange, said blades being twisted about their longitudinal axes to incline the same laterally from said flange.

2. In a landing gear for airplanes, including a column adapted to depend from said airplane and having a lateral axle, a wheel having a hub rotatable on said axle, an impeller unit at one side of said wheel comprising a tubular sleeve fitted over said hub, a radial plate forming circular flange surrounding said hub, a series of impeller blades radiating from said hub and having side edges attached to said flange, said blades being twisted about their longitudinal axes to incline the same laterally from said flange, and a semicircular hood fixed to said column and covering the series of blades above the axle.

ARCHIE CHARLES GIBSON.